United States Patent
Bansal et al.

(10) Patent No.: US 11,921,603 B2
(45) Date of Patent: Mar. 5, 2024

(54) AUTOMATED INTEROPERATIONAL TRACKING IN COMPUTING SYSTEMS

(71) Applicant: Microsoft Technology Licensing, LLC, Redmond, WA (US)

(72) Inventors: Gunjan Bansal, San Jose, CA (US); Niteesh Kumar, Vancouver (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 303 days.

(21) Appl. No.: 17/395,217

(22) Filed: Aug. 5, 2021

(65) Prior Publication Data
US 2023/0040862 A1 Feb. 9, 2023

(51) Int. Cl.
G06F 11/30 (2006.01)
G06F 16/33 (2019.01)
G06F 16/903 (2019.01)
G06F 40/211 (2020.01)
G06F 40/284 (2020.01)

(52) U.S. Cl.
CPC ...... *G06F 11/3075* (2013.01); *G06F 16/3344* (2019.01); *G06F 16/90344* (2019.01); *G06F 40/211* (2020.01); *G06F 40/284* (2020.01)

(58) Field of Classification Search
CPC ............ G06F 11/3075; G06F 16/3344; G06F 16/90344; G06F 40/211; G06F 40/284; G06F 17/40; G06F 2201/86; G06F 2201/865; G06F 11/302; G06F 11/3476; G06F 11/3006
See application file for complete search history.

(56) References Cited

U.S. PATENT DOCUMENTS

| | | | |
|---|---|---|---|
| 11,023,346 B2* | 6/2021 | Wilding | G06F 11/302 |
| 11,163,731 B1* | 11/2021 | Riddell | G06F 7/5443 |
| 2012/0246303 A1* | 9/2012 | Petersen | G06F 16/1734 |
| | | | 709/224 |

(Continued)

FOREIGN PATENT DOCUMENTS

JP 2009170034 A 7/2009

OTHER PUBLICATIONS

Zhu, et al., "Tools and Benchmarks for Automated Log Parsing", In Proceedings of IEEE/ACM 41st International Conference on Software Engineering: Software Engineering in Practice (ICSE-SEIP), May 25, 2019, pp. 121-130.

(Continued)

*Primary Examiner* — Daxin Wu
(74) *Attorney, Agent, or Firm* — Ray Quinney & Nebeker (57) ABSTRACT

Techniques of automated interoperation tracking in computing systems are disclosed herein. One example technique includes tokenizing a first event log from a first software component and a second event log from the second software component by calculating frequencies of appearance corresponding to strings in the first and second event logs and selecting, as tokens, a first subset of the strings in the first event log and a second subset of the strings in the second event log individually having calculated frequencies of appearance above a preset frequency threshold. The example technique can also include generating an overall event log for a task executed by both the first and second software components by matching one of the strings in the first subset to another of the strings in the second subset.

20 Claims, 6 Drawing Sheets

(56) References Cited

U.S. PATENT DOCUMENTS

| | | | |
|---|---|---|---|
| 2013/0046664 A1* | 2/2013 | Kazerani | G06F 11/1433 |
| | | | 705/34 |
| 2016/0103862 A1* | 4/2016 | Boe | H04L 41/5012 |
| | | | 707/744 |
| 2017/0161166 A1* | 6/2017 | Shivaprasad | G06F 11/079 |
| 2018/0165142 A1* | 6/2018 | Harutyunyan | G06F 11/0751 |
| 2018/0203757 A1* | 7/2018 | Akune | G06F 11/0784 |
| 2019/0073406 A1* | 3/2019 | Xu | B01D 29/111 |
| 2019/0205197 A1* | 7/2019 | Hartman | G06F 11/0751 |
| 2019/0342088 A1* | 11/2019 | Eidson | H04L 9/14 |
| 2020/0057756 A1* | 2/2020 | Giuca | G06F 16/332 |
| 2020/0220768 A1* | 7/2020 | Davis | G06F 17/40 |
| 2021/0073097 A1* | 3/2021 | Upadhyay | G06F 11/0757 |
| 2021/0073103 A1* | 3/2021 | Ross | G06F 17/40 |
| 2021/0119892 A1* | 4/2021 | Kant | G06F 11/3447 |

OTHER PUBLICATIONS

"International Search Report and Written Opinion Issued in PCT Application No. PCT/US22/035380", dated Oct. 6, 2022, 14 Pages.

\* cited by examiner

AUTOMATED INTEROPERATIONAL TRACKING IN COMPUTING SYSTEMS

BACKGROUND

In computing, software tracing generally refers to a type of data logging to record certain information about execution of software applications or processes. For instance, exceptions encountered during execution of a software application can be logged as a trace with multiple data points each representing an "event" or "error." A trace can also include additional data points for sub-component calls, process initiations, execution interruptions, process completions, or other types of occurrences, outcomes, or incidents encountered during execution. Such traces can be useful for developing and/or troubleshooting software applications. For instance, software developers can analyze exceptions or other events in traces to identify potential software bugs that impact execution or performance of software applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Recorded traces can aid software developers to analyze execution of software applications for debugging, troubleshooting, performance improvement, or other suitable purposes. For instance, a recorded trace can include data arranged in a table with columns representing various data fields and rows representing entries having recorded values corresponding to the data fields in the columns. Various types of events in a recorded trace can also be displayed on a graphical user interface as represented by various graphical interface elements of different shapes (e.g., dots, diamonds, stars, triangles, squares, etc.), colors (e.g., red, green, blue, etc.), sizes (e.g., large, medium, small, etc.), or otherwise distinguishable from one another. The various graphical interface elements are typically arranged in a chronological order as a "timeline" according to timestamps along an axis (e.g., a horizontal axis) representing elapsed time.

Though traces are useful for various purposes, recording a trace from multiple independently data sources such as separate hardware/software components of a cloud computing system, may be difficult. For example, in a cloud computing system, a user can submit a request for a task (e.g., instantiating a virtual machine or "VM" to execute a software application) to a resource manager of the cloud computing system. Upon receiving the request, the resource manager can request one or more other computing services to complete portions of the requested task. For instance, the resource manager can initially call a subscription service to verify whether the user's subscription allows the requested task. Upon successful verification, the resource manager can call a compute resource provider to allocate suitable compute resources (e.g., servers) and a storage service to allocate suitable storage spaces. The various computing services called by the resource manager may then call other computing services (e.g., gateway services, virtual network services, etc.) when executing the requests from the resource manager.

The various computing services in the cloud computing system can separately record a component trace for events monitored during execution of the requests from the resource manager. However, such component traces may not be readily combined to form an overall trace corresponding to the requested task from the user due to a lack of tracking identifier (or tracking ID) shared among the computing services. In component traces, some entries are related to the requested task while others are related to other tasks executed by those computing services. The recorded component traces can also include different data fields (e.g., columns with different identifiers) configured to contain different data. As such, without a tracking ID, different entries in the component traces may not be easily correlated to the requested task. Thus, when an issue is detected during execution of the request task (e.g., instantiation delayed or failed), a technician may have difficulty determining which computing service(s) in the cloud computing system that caused the problem.

One solution to the foregoing difficulty is to perform correlation of entries from different component traces manually. However, given that a recorded component trace from one data source can be hundreds of even thousands of gigabytes in thirty minutes, such manual correlation can be labor intensive, impractical, or even impossible at times. Another solution is to instrument the various components in the cloud computing system to pass on a tracking ID corresponding to the requested task when recording the component traces. However, instrumenting a software component can be costly and error prone because code changes to instrument the various components can be complicated and time consuming. In certain cloud computing systems, to instrument one software component may sometimes take two to six months.

Several embodiments of the disclosed technology can address some aspects of the foregoing difficulties by deploying a trace correlator that is configured to automate interoperation tracking without instrumenting or re-instrumenting distinct data sources in a computing system. In certain implementations, the trace correlator can be configured to tokenize individual component traces from distinct data sources to identify strings or "tokens" that appear less frequently in the component traces than others based on a frequency threshold (e.g., 1%, 3%, 5%, etc.). Examples of a token can include a globally unique identifier ("GUID"), a string without spaces (e.g., "65a7d61d-62c9"), or at least a partial universal resource locator ("URL"). In other examples, a token can also include a combination of at least two of the foregoing or other suitable types of data. Example operations of extracting such tokens are described in more detail below.

When tokenizing the component traces, the trace correlator can be configured to perform various operations to exclude non- or less-unique words and/or phrases from the component traces. For example, the trace correlator can be configured to initially remove the following categories of words and/or phrases from the component traces:
- articles, e.g., "a," "the," "an," etc.;
- coordinating conjunctions, e.g., "for," "and," "nor," "but," "or," "yet," "so," etc.;
- subordinating Conjunctions, e.g., "though," "before," "until," "that," etc.
- correlative Conjunctions, e.g., "as," "if . . . then," "also," etc.
- conjunctive Adverbs, e.g., "also," "however," "still," then," etc.

In other examples, the trace correlator can be configured to remove transitions for similarity (e.g., "too"), contradiction (e.g., "instead"), cause (e.g., "due to"), examples (e.g., "like"), effect (e.g., "as a result"), conclusion (e.g., "in conclusion"), time (e.g., "during"), space (e.g., "here"), or other suitable functions. In further examples, prepositions such as "on," "at," "to," "from," or other suitable types of non-unique words can also be removed. In yet further examples, the trace correlator can be configured to remove a list of non-unique words such as "failed", "exception", "deployment," "error," etc. pre-defined by an administrator or user.

Upon removing the non- or less-unique words and/or phrases from the component traces, the trace correlator can be configured to sort the remaining words and/or phrases according to a frequency of appearance in the corresponding component traces. Based on the sorted component traces, the trace correlator can be configured to extract a subset of sufficiently unique words and/or phrases from the individual component traces. In one example, words and/or phrases appearing less than a frequency threshold (e.g., 1%, 3%, 5%, etc.) in the component traces can be selected. In other examples, top three, five, ten, twenty, or one hundred words and/or phrases with the lowest frequencies of threshold may be selected. In further examples, the sufficiently unique words and/or phrases can be selected according to a length of characters, a type of characters, or in other suitable ways.

In certain embodiments, the frequency threshold can be adjusted based on numbers of items in the extracted subset of words and/or phrases. For example, when the extracted subset of words and/or phrases exceeds a high threshold (e.g., ten, fifty, one hundred, etc.), the frequency threshold can be decreased to the high threshold is not exceeded. On the other hand, when the subset of words and/or phrases is below a low threshold (e.g., one, two, five, etc.), the frequency threshold can be increased. In other embodiments, the frequency threshold can be adjusted based on correlation results of entries in the component traces described below or based on other suitable criteria.

The trace correlator can be configured to use the extracted subset of sufficiently unique words and/or phrases from the component traces as tokens to correlate entries in individual component traces. The inventors have recognized that different components in a computing system (e.g., computing services in a cloud computing system) may use the same sufficiently unique strings in different data fields of the recorded component traces. For instance, in the example above, the resource manager may record a first trace identifying the requested task using a "Service Request ID" of, e.g., "65a7d61d-62c9." However, when the resource manager calls the other computing services, the other components of the cloud computing system may not record events indexed to the same "Service Request ID." Instead, the subscription service may record events associated with the requested task using, e.g., a "Http Outgoing Request ID" with the same sufficiently unique string in a second trace. Such mismatch in data fields can occur when, for instance, the resource manager calls the subscription service for the requested task. The resource manager then periodically polls the subscription service regarding completion of the requested task with an identifier (e.g., "65a7d61d-62c9") known to both components. Alternatively, the subscription service can notify the resource manager regarding completion of the requested task using the same identifier upon completion.

Though the "Http Outgoing Request" and the "Service Request ID" can be different data fields in the first and second traces, the string "65a7d61d-62c9" shared by both the first and second traces can be used as a token to correlate entries from the first and second traces. For example, a first entry corresponding to "65a7d61d-62c9" in the first trace can be correlated to a second entry corresponding to the same value in the second trace as a call from the resource manager to the subscription service even though "65a7d61d-62c9" appears in different data fields of the first and second traces. As such, events from both the resource manager and the subscription service can be correlated to form an interoperation trace of the requested task. In certain embodiments, a single token, e.g., "65a7d61d-62c9" can be used to correlate the entries in the first and second traces. In other embodiments, a combination of multiple strings shared between the first and second traces can be used as a composite token to correlate entries in the first and second traces.

In certain examples, the same sufficiently unique string, e.g., "65a7d61d-62c9" can be used as a token to correlate entries in multiple pairs of component traces when, for example, the same token is used by another computing service called by the subscription service when executing the request from the resource manager. In other examples, different sufficiently unique strings can be used to correlate different pairs of entries in multiple component traces. For example, "65a7d61d-62c9" can be used to correlate the first and second entries in the first and second traces. Another sufficiently unique string, e.g., "1a-9009b5598" in a "Responsible body" of the second trace can be used to correlate to a third entry in a third trace having a "Service ID" having the same string. As such, by recursively performing the foregoing tokenization and correlation, the trace correlator can be configured to build an overall trace corresponding to the requested task by the user.

Several embodiments of the disclosed technology can be efficient and effective in generating an overall trace of executing a requested task from a user in a complex computing system with multiple interoperating hardware/software components without instrumenting each hardware/software components. By identifying sufficiently unique strings in the component traces, the trace correlator can be configured to use such strings as tokens to correlate entries from different component traces to form an overall trace of the requested task without code changes to the various hardware/software components to implement a tracking ID. Such correlation can be performed based on historical event logs or may be performed near real time based on real-time event logs. Thus, an overall trace corresponding to the requested task can be generated to aid debugging, troubleshooting, or other suitable purpose without impacting the code base or operations of the various hardware/software components in the computing system.

DETAILED DESCRIPTION

Certain embodiments of systems, devices, components, modules, routines, data structures, and processes for automated interoperational tracking in a distributed computing system are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6. For example, instead of being implemented distributed computing systems, aspects of the disclosed technique disclosed herein can also be implemented in enterprise computing systems or other suitable types of computing systems.

As used herein, the term "distributed computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device. In certain embodiments, a host can be configured to implement, for instance, one or more virtual machines, virtual switches, or other suitable virtualized components. For example, a host can include a server having a hypervisor configured to support one or more virtual machines, virtual switches, or other suitable types of virtual components. In other embodiments, a host can be configured to execute suitable applications directly on top of an operating system.

A computer network can be conceptually divided into an overlay network implemented over an underlay network in certain implementations. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network. In other implementations, a computer network can only include the underlay network.

As used herein, the term "computing service" generally refers to one or more computing resources provided over a computer network such as the Internet. Example computing services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "resource provider" generally refers to a computing service that is configured to provide or make available one or more services or resources of a computing system. The resources can be deployed and managed through, for example, a "resource manager" accessible via a user portal. In certain embodiments, a resource provider can be configured to offer representational state transfer ("REST") Application Programming Interfaces ("APIs") for working with associated resources. For example, a resource provider can be configured to deploy a secret storage (e.g., a key vault) for storing keys and credentials. In other embodiments, resource providers can also provide computing resources (e.g., virtual machines), storage resources (e.g., network storage), network resources (e.g., virtual networks), database resources (e.g., database servers), or other suitable types of resources.

As used herein, an "event log" or a "trace" generally refers to a collection of data that records hardware/software operational occurrences and/or errors in computing systems. For example, an operating system or an application executing on a computing device can record various error messages, such as application stopped responding, memory fault, etc. In another example, firmware on a processor of the computing device can also record events and/or errors (e.g., internal memory error) encountered by the processor during operation. In further examples, multiple components of a distributed computing system can also individually record corresponding event logs. Examples of such components can include computing services and/or resources in the distributed computing system.

An event log can be organized in various suitable ways. For instance, an event log can include a file having common separated values each corresponding to a data field (e.g., a system ID, a timestamp, etc.). In another example, an event log can include a database table having columns of data fields and rows with values corresponding to the data fields in the columns. Each row can be referred to as an entry in the event log. In further examples, an event log can be organized as an array or can have other suitable structured or non-structured format.

Also used herein, a "frequency of appearance" generally refers to a percentage or ratio that a string, word, or phrase appears in a file over a total number of appearances of all strings, words, or phrases in the file, such as an event log. For instance, if a string, e.g., "65a7d61d-62c9" appears once in a file with two other strings each appearing twice in the file, then the string "65a7d61d-62c9" has a frequency of appearance of $(1/(1+2*2))=20\%$ or a ratio of 0.2. When calculating a frequency of appearance of the string, all strings in the file can be initially identified. The number of appearances of each of the strings can then be identified and used to derive a total appearance number. Then, the frequency of appearance of the string can be calculated by dividing the number of appearances of "65a7d61d-62c9" by the total number of appearances.

Figure 1:
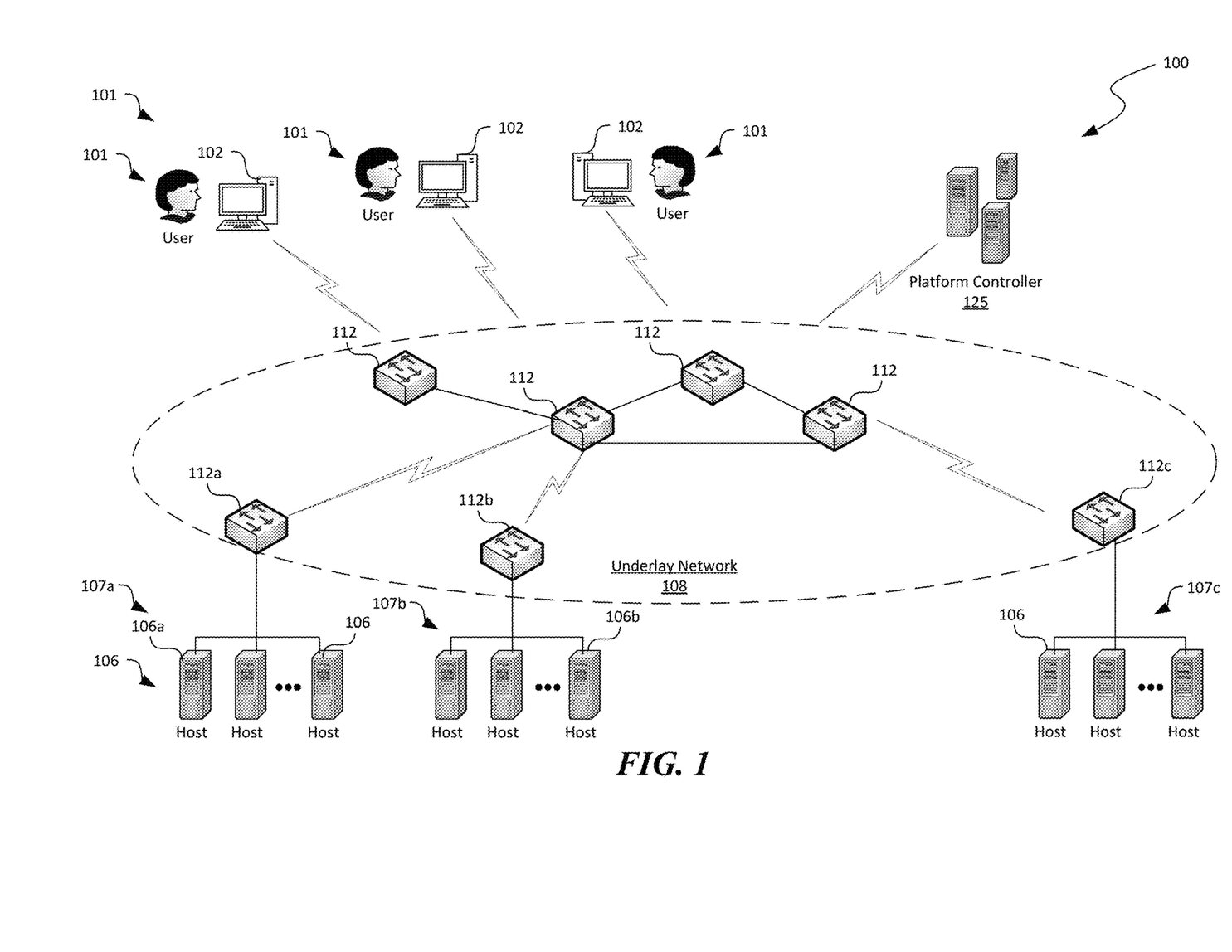
FIG. 1 is a schematic diagram illustrating a distributed computing system implementing automated interoperational tracking in accordance with embodiments of the disclosed technology.

FIG. 1 is a schematic diagram illustrating a distributed computing system 100 implementing automated interoperational tracking in accordance with embodiments of the disclosed technology. As shown in FIG. 1, the distributed computing system 100 can include an underlay network 108 interconnecting a plurality of hosts 106, a plurality of client devices 102 associated with corresponding users 101, and a platform controller 125 operatively coupled to one another. The platform controller 125 can be a cluster controller, a fabric controller, a database controller, and/or other suitable types of controllers configured to monitor and manage resources and operations of the servers 106 and/or other components in the distributed computing system 100. Even though certain hardware components are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. Each of the host sets 107a-107c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topologies. The underlay network 108 can allow communications among hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) or containers (not shown) upon requests from the users 101. The users 101 can then utilize the provided virtual machines 144 or containers to perform database, computation, communications, and/or other suitable tasks. In certain embodiments, one of the hosts 106 can provide virtual machines 144 for multiple users 101. For example, the host 106a can host three virtual machines 144 individually corresponding to each of the users 101. In other embodiments, multiple hosts 106 can host virtual machines 144 for the users 101.

The client devices 102 can each include a computing device that facilitates the users 101 to access computing services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the distributed computing system 100 can facilitate any suitable numbers of users 101 to access cloud or other suitable types of computing services provided by the hosts 106 in the distributed computing system 100.

Figure 2:
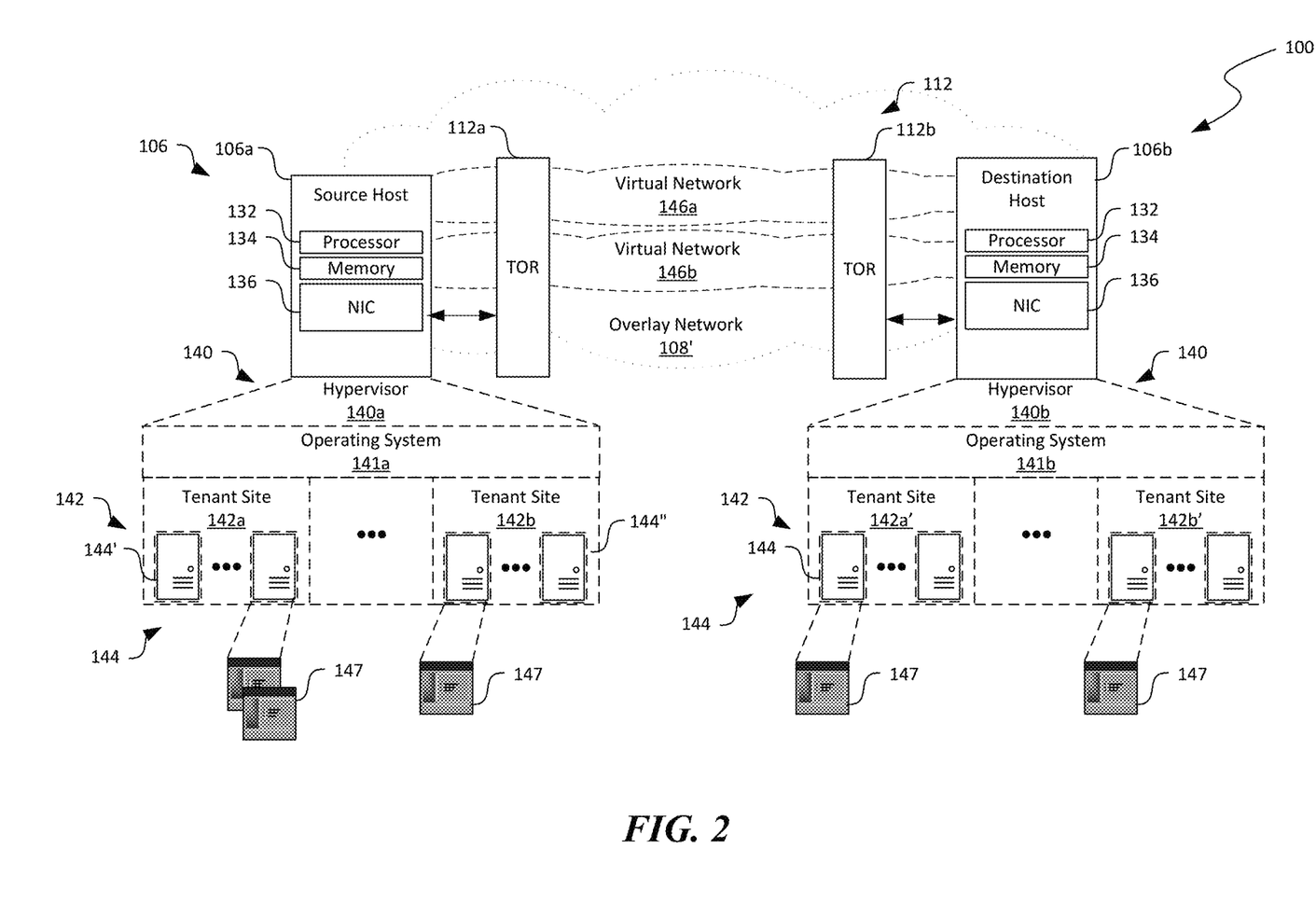
FIG. 2 is a schematic diagram illustrating certain example hardware/software components of the distributed computing system of FIG. 1 implementing automated interoperational tracking in accordance with embodiments of the disclosed technology.

FIG. 2 is a schematic diagram illustrating certain example hardware/software components of the distributed computing system 100 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the distributed computing system 100 can include hosts 106 (e.g., a source host 106a and a destination host 106') interconnected by an overlay network 108'. The source host 106a and the destination hosts 106b and 106b' can each include a processor 132, a memory 134, and a network interface card 136 operatively coupled to one another. In other embodiments, the source or destination host 106a and 106b can also include input/output devices configured to accept input from and provide output to an operator and/or an automated software controller (not shown), or other suitable types of hardware/software components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 5A-5D). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The source host 106a and the destination host 106b can individually contain instructions in the memory 134 executable by the processors 132 to cause the individual processors 132 to provide a hypervisor 140 (identified individually as first and second hypervisors 140a and 140b) and an operating system 141 (identified individually as first and second operating systems 141a and 141b). Even though the hypervisor 140 and the operating system 141 are shown as separate components, in other embodiments, the hypervisor 140 can operate on top of the operating system 141 executing on the hosts 106 or a firmware component of the hosts 106.

The hypervisor 140 can be configured to generate, monitor, terminate, and/or otherwise manage one or more virtual machines 144 organized into tenant sites 142. For example, as shown in FIG. 2, the source host 106a can provide a first hypervisor 140a that manages first and second tenant sites 142a and 142b, respectively. The destination host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a tenant (not shown). For example, the source host 106a and the destination host 106b can both host the tenant site 142a and 142a' for a first tenant. The source host 106a and the destination host 106b can both host the tenant site 142b and 142b' for a second tenant. Each virtual machine 144 can be executing a corresponding operating system, middleware, and/or applications.

Also shown in FIG. 2, the overlay network 108' can include one or more virtual networks 146 that interconnect the tenant sites 142a and 142b across multiple hosts 106. For example, a first virtual network 142a interconnects the first tenant sites 142a and 142a' at the source host 106a and the destination host 106b. A second virtual network 146b interconnects the second tenant sites 142b and 142b' at the source host 106a and the destination host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more software applications 147 to provide suitable cloud or other suitable types of computing services to the users 101 (FIG. 1). For example, the source host 106a can execute a software application 147 that is configured to provide a computing service that monitors online trading and distribute price data to multiple users 101 subscribing to the computing service. The virtual machines 144 on the virtual networks 146 can also communicate with one another via the underlay network 108 (FIG. 1) even though the virtual machines 144 are located on different hosts 106.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches 141, the virtual machines 144, applications 147 executing on the virtual machines 144, the hypervisors 140, or other suitable types of components.

In operation, the software application 147, the virtual machine 144, and/or other suitable software components on the source host 106a can generate an outbound packet destined to, for instance, other software applications 147 at the destination host 106b. The NIC 136 at the source host 106a can forward the generated packet to the first TOR 112a, which in turn forwards the packet to the second TOR 112b via the overlay/underlay network 108 and 108'. The second TOR 112b can then forward the packet to the NIC 136 of the destination host 106b, which can then forward the packet to one of the software applications 147 executed at the destination host 106b.

Figure 3A:
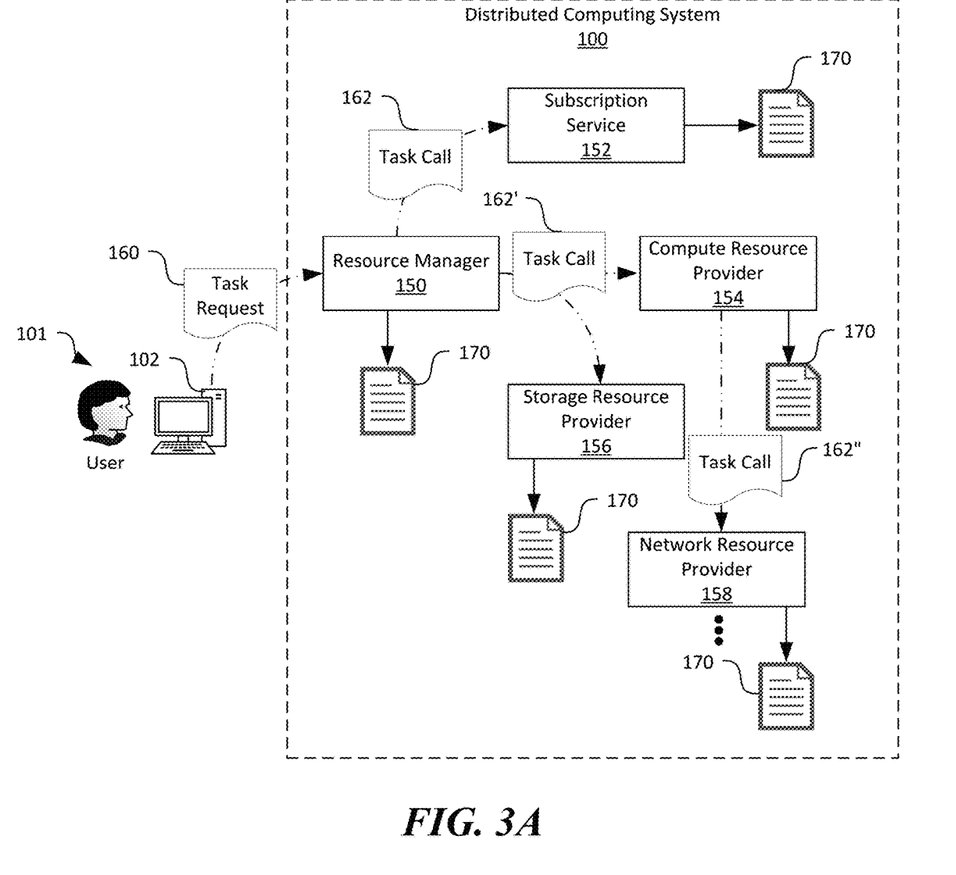
FIG. 3A is a schematic diagram illustrating examples of interoperational components in the distributed computing system of FIG. 1 individually configured to record a component trace in accordance with embodiments of the disclosed technology.

The virtual machines 144 at the various hosts 106 can each execute suitable software applications 147 to provide a computing service to the users 101 and/or to other computing services in the distributed computing system 100. For example, FIG. 3A illustrates example interoperations of various computing services in the distributed computing system 100 of FIG. 1 in accordance with embodiments of the disclosed technology. As shown in FIG. 1, the distributed computing system 100 can include a resource manager 150 configured to receive a task request 160 from a user 101 and call various other computing services to execute the requested task. For example, the resource manager 150 can submit a task call 162 to a subscription service 152 configured to verify that the user 101 indeed has subscription to the requested task. Upon verification, the resource manager 150 can then submit additional task calls 162' to, for instance, the compute resource provider 154 to allocate compute resources to execute the requested task and the storage resource provider 156 to allocate suitable storage space to store results of executing the requested task. In turn, the compute resource provider 154 can submit another task call 162" to a network resource provider 158 to request network bandwidth or other suitable resources to facilitate execution of the requested task.

As shown in FIG. 3A, the various computing services can separately record a component trace 170 for events monitored during execution of the various computing services. However, such component traces 170 may not be readily combined to form an overall trace corresponding to the requested task from the user 101 due to a lack of tracking identifier shared among the computing services. In component traces 170, some entries are related to the requested task while others are related to other tasks executed by those computing services. Thus, without a tracking identifier, one may not readily discern which entry in one component trace corresponds to another entry in another component trace.

Figure 3B:
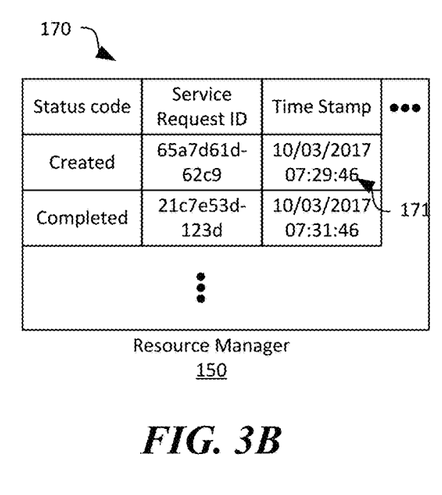
FIGS. 3B and 3C are schematic diagrams illustrating example component traces recorded by two of the interoperational components in FIG. 3A in accordance with embodiments of the disclosed technology.
Figure 3C:
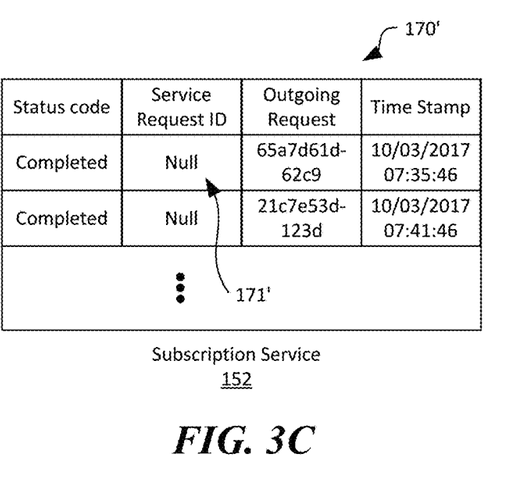

The recorded component traces 170 can also include different data fields (e.g., columns with different identifiers) configured to contain different data. For example, as shown in FIGS. 3B and 3C, a first component trace 170 recorded by the resource manager 150 can include a table having data fields of "Status code," "Service Request ID," and "Time Stamp" which a second component trace 170' recorded by the subscription service 152 can have another table having data fields of "Status code," "Service Request ID," "Outgoing Request," and "Time Stamp." As such, without a tracking ID to identify associated entries, different entries in the component traces 170 and 170' may not be easily correlated to the requested task. Thus, when an issue is detected during execution of a request task (e.g., instantiation of a VM), a technician or administrator may have difficulty determining which computing service(s) in the distributed computing system 100 that caused the problem.

One solution to the foregoing difficulty is to perform correlation of entries from different component traces 170 manually. However, given that a recorded component trace 170 from one data source can be hundreds of even thousands of gigabytes in thirty minutes, such manual correlation can be labor intensive, impractical, or even impossible at times. Another solution is to instrument the various components (e.g., the resource manager, the subscription manager, the compute resource provider, the storage resource provider, and the network resource provider) in the distributed computing system 100 to pass on a tracking ID corresponding to the requested task when recording the component traces 170. However, instrumenting a software application 147 (FIG. 2) that provides a corresponding computing service can be costly and error prone because code changes to the various components can be complicated and time consuming.

Figure 4:
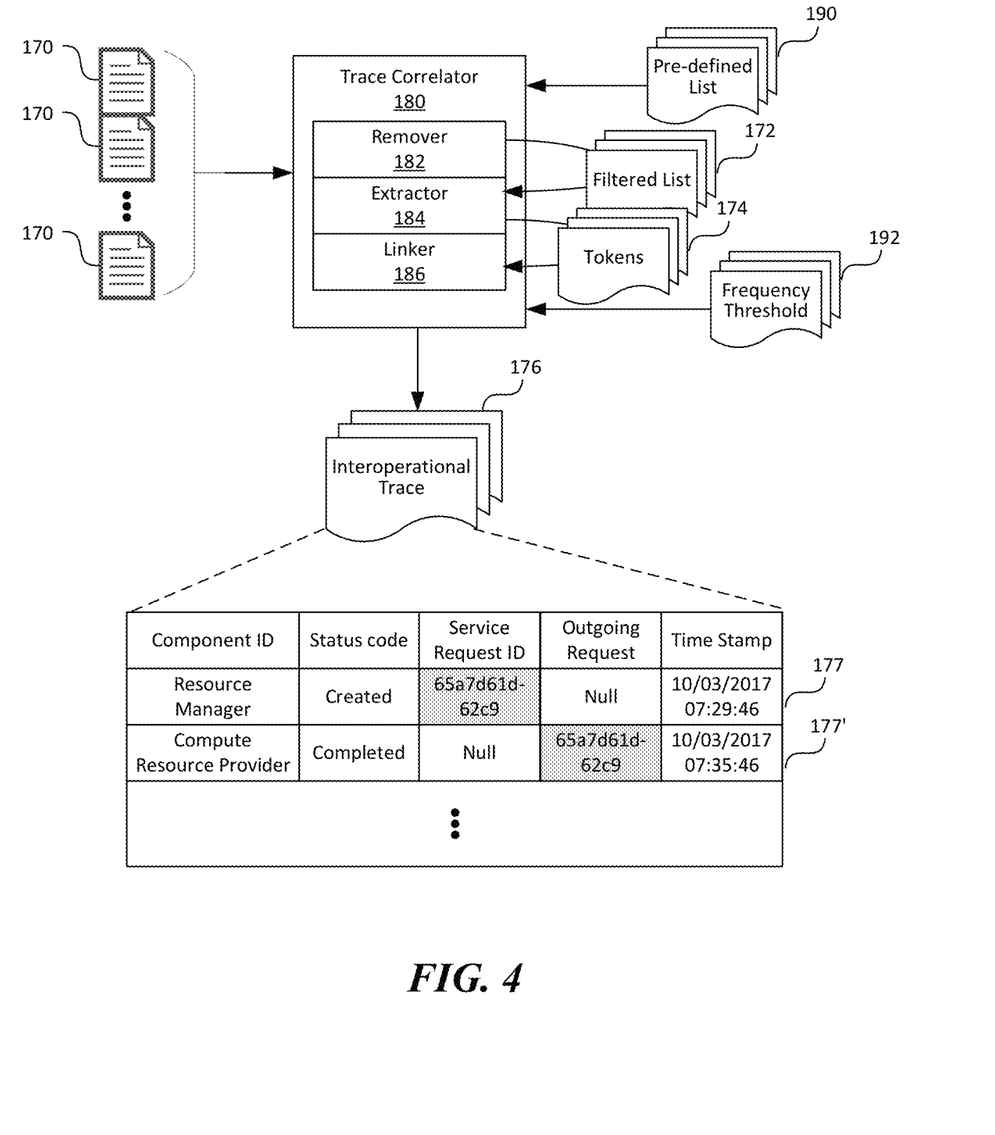
FIG. 4 is a schematic diagram illustrating certain components of an example trace correlator configured for automated interoperational tracking.

As shown in FIG. 4, several embodiments of the disclosed technology can address some aspects of the foregoing difficulties by deploying a trace correlator 180 that is configured to automate interoperation tracking without instrumenting distinct data sources in the distributed computing system 100. As shown in FIG. 4, the trace correlator 180 can include a remover 182, an extractor 184, and a linker 186 operatively coupled to one another. Though particular components of the trace correlator 180 is shown in FIG. 4 for illustration purposes, in other embodiments, the trace correlator 180 can also include input/output, calculation, or other suitable types of components.

In certain implementations, the trace correlator 180 can be configured to tokenize individual component traces 170 from distinct data sources (e.g., the computing services shown in FIG. 3A) to identify strings or "tokens" that appear less frequently in the component traces 170 than others based on a frequency threshold (e.g., 1%, 3%, 5%, etc.) or other suitable criteria. Examples of a token can include a globally unique identifier ("GUID"), a string without spaces (e.g., "65a7d61d-62c9" shown in FIG. 3B), or at least a partial universal resource locator ("URL"). In other examples, a token can also include a combination of at least two of the foregoing or other suitable types of data. Example operations of extracting such tokens are described in more detail below.

As shown in FIG. 4, the remover 182 can be configured to perform various operations to exclude non- or less-unique words and/or phrases from the component traces 170 to generate a filtered list 172. For example, the remover 182 can be configured to initially remove the following categories of words and/or phrases from the component traces:

articles, e.g., "a," "the," "an," etc.;
coordinating conjunctions, e.g., "for," "and," "nor," "but," "or," "yet," "so," etc.;
subordinating Conjunctions, e.g., "though," "before," "until," "that," etc.
correlative Conjunctions, e.g., "as," "if . . . then," "also," etc.
conjunctive Adverbs, e.g., "also," "however," "still," then," etc.

In other examples, the remover 182 can be configured to remove transitions for similarity (e.g., "too"), contradiction (e.g., "instead"), cause (e.g., "due to"), examples (e.g., "like"), effect (e.g., "as a result"), conclusion (e.g., "in conclusion"), time (e.g., "during"), space (e.g., "here"), or other suitable functions. In further examples, prepositions such as "on," "at," "to," "from," or other suitable types of non-unique words can also be removed. In yet further examples, the remover 182 can be configured to remove a list of non-unique words such as "failed", "exception", "deployment," "error," etc. from a pre-defined list established by an administrator or user 101.

Upon removing the non- or less-unique words and/or phrases from the component traces 170, the remover 182 can be configured to transmit the filtered list 172 to the extractor 184 for further processing. In one embodiment, the extractor 184 can be configured to sort the remaining words and/or phrases in the filtered list 172 according to a frequency of appearance in the corresponding component traces 170. Based on the sorted component traces 170, the extractor 184 can be configured to extract a subset of sufficiently unique words and/or phrases from the individual component traces 170 as tokens 174 based on a frequency threshold 192. In one example, words and/or phrases appearing less than a frequency threshold (e.g., 1%, 3%, 5%, etc.) in the component traces 170 can be selected. In other examples, top three, five, ten, twenty, or one hundred words and/or phrases with the lowest frequencies of threshold may be selected. In further examples, the sufficiently unique words and/or phrases can be selected according to a length of characters, a type of characters, or in other suitable ways.

In certain embodiments, the frequency threshold 192 can be adjusted based on numbers of items in the tokens 174 of extracted subset of words and/or phrases. For example, when the tokens 174 of extracted subset of words and/or phrases exceeds a high threshold (e.g., ten, fifty, one hundred, etc.), the frequency threshold 192 can be decreased to the high threshold is not exceeded. On the other hand, when the tokens 174 of the subset of words and/or phrases is below a low threshold (e.g., one, two, five, etc.), the frequency threshold 192 can be increased. In other embodiments, the frequency threshold 192 can be adjusted based on correlation results of entries in the component traces 170 described below or based on other suitable criteria.

Upon extracting the tokens 174, the extractor 184 can be configured to provide the tokens 174 to the linker 186 to correlate entries in the component traces 170. Upon receiving the tokens 174, the linker 186 can be configured to use the tokens 174 of extracted subset of sufficiently unique words and/or phrases from the component traces to correlate entries in individual component traces 170. The inventors have recognized that different components in the distributed computing system 100 may use the same sufficiently unique strings in different data fields of the recorded component traces 170. For instance, as shown in FIGS. 3B and 3C, the resource manager 150 may record the first component trace 170 identifying the requested task using a "Service Request ID" of, e.g., "65a7d61d-62c9." However, when the resource manager 150 calls the other computing services (e.g., the subscription service 152), the subscription service 152 may not record events indexed to the same "Service Request ID." Instead, the subscription service 152 may record events associated with the requested task using, e.g., a "Http Outgoing Request ID" with the same sufficiently unique string in the second component trace 170' while the "Service Request ID" contains a null value in the second component trace 170'. Such mismatch in data fields can occur when, for instance, the resource manager 150 calls the subscription service 152 for the requested task. The resource manager 150 then periodically polls the subscription service 152 regarding completion of the requested task with an identifier or token (e.g., "65a7d61d-62c9") known to both the resource manger 150 and the subscription service 152. Alternatively, the subscription service 152 can notify the resource manager 150 regarding completion of the requested task using the same identifier upon completion.

Though the "Http Outgoing Request" in the second component trace 170' and the "Service Request ID" in the first component trace 170 can be different data fields, the string "65a7d61d-62c9" shared by both the first and second component traces 170 and 170' can be used as a token 174 to correlate entries from the first and second component traces 170 and 170'. For example, a first entry 171 corresponding to "65a7d61d-62c9" in the first component trace 170 can be correlated to a second entry 171' corresponding to the same value in the second component trace 170' as a call from the resource manager 150 to the subscription service 152 even though "65a7d61d-62c9" appears in different data fields of the first and second component traces 170 and 170'. As such, events from both the resource manager 150 and the subscription service 152 can be correlated to form an interoperation trace 176 (FIG. 4) of the requested task. In certain embodiments, a single token 174, e.g., "65a7d61d-62c9" can be used to correlate the entries in the first and second component traces 170 and 170'. In other embodiments, a combination of multiple strings shared between the first and second component traces can be used as a composite token to correlate entries in the first and second component traces. As shown in FIG. 4, the interoperational trace 176 can include a first entry 177 from the first component trace 170 in FIG. 3A and a second entry 177' from the second trace 170' in FIG. 3B. The interoperational trace 176 can also include a new data filed "Component ID" to identify which component trace 170 an entry 177 in the interoperational trace 176 comes from.

In certain examples, the same sufficiently unique string, e.g., "65a7d61d-62c9" can be used as a token 174 to correlate entries in multiple pairs of component traces 170 when, for example, the same token 174 is used by another computing service (e.g., the compute resource provider 154 in FIG. 3A) called by the subscription service 152 when executing the request from the resource manager 150. In other examples, different sufficiently unique strings can be used to correlate different pairs of entries in multiple component traces 170. For example, "65a7d61d-62c9" can be used to correlate the first and second entries in the first and second component traces 170 and 170' recorded by the resource manager 150 and the subscription service 152, respectively. Another sufficiently unique string, e.g., "1a-9009b5598" in a "Responsible body" of the second component trace 170' can be used to correlate to a third entry (not shown) in a third trace (not shown) having a "Service ID" having the same string and recorded by, for instance, the compute resource provider 154. As such, by recursively performing the foregoing tokenization and correlation, the trace correlator 180 can be configured to build the interoperational trace 176 corresponding to the requested task by the user 101.

Several embodiments of the disclosed technology can be efficient and effective in generating an interoperational trace 176 of executing a requested task from a user 101 in a complex computing system such as the distributed computing system 100, without instrumenting each hardware/software components. By identifying sufficiently unique strings in the component traces 170, the trace correlator 180 can be configured to use such strings as tokens 174 to correlate entries from different component traces 170 to form the interoperational trace of the requested task without code changes to implement a tracking ID in the various hardware/software components providing the computing services. Such correlation can be performed based on historical event logs or may be performed near real time based on real-time event logs. Thus, the interoperational trace 176 corresponding to the requested task can be generated to aid debugging, troubleshooting, or other suitable purpose without impacting the code base or operations of the various hardware/software components in the distributed computing system 100.

Figure 5A:
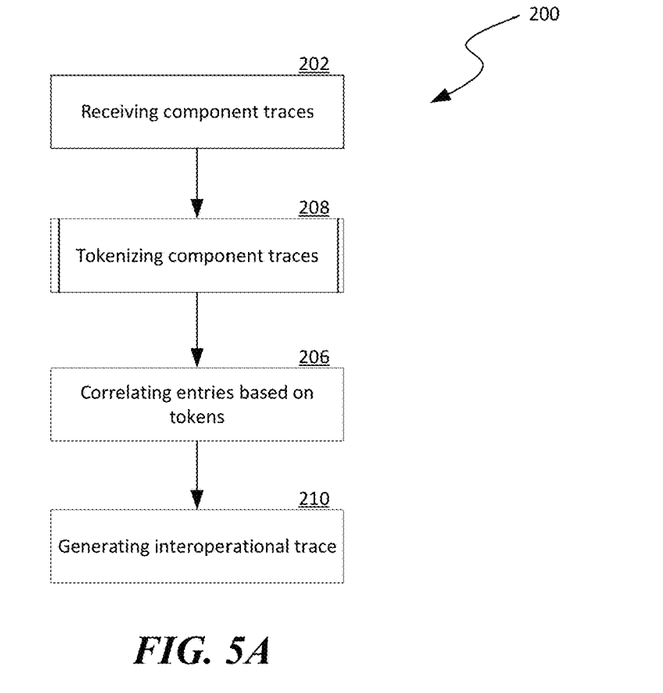
FIGS. 5A and 5B are flowcharts illustrating example processes for automated interoperational tracking in accordance with embodiments of the disclosed technology.
Figure 5B:
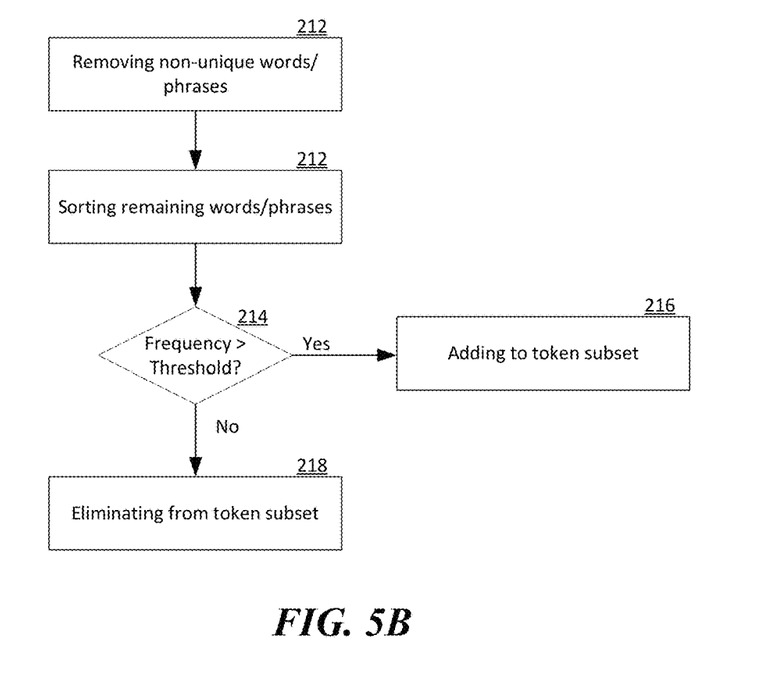

FIGS. 5A and 5B are flowcharts illustrating example processes for automated interoperational tracking in accordance with embodiments of the disclosed technology. Though aspects of the processes are described below in the context of the distributed computing system 100, in other embodiments, the processes may also be implemented in computing systems with additional and/or different hardware/software components.

As shown in FIG. 5A, a process 200 can include receiving component traces from distinct data sources at stage 202. In one example, the distinct data sources can be different computing services in the distributed computing system 100. In other examples, the distinct data sources can also include hardware/software components external to the distributed computing system 100 or include other suitable types of data sources. The process 200 can also include tokenizing the received component traces at stage 208. Example operations of tokenizing the component traces are described below with reference to FIG. 5B. The process 200 can then include correlating entries in different received component traces using tokens identified in the received component traces at stage 206. Example operations of correlating the entries are described above with reference to FIG. 4. The process 200 can then include generating an interoperational trace with the correlated entries at stage 210.

As shown in FIG. 5B, example operations of tokenizing a component trace can include removing non- or less unique words and/or phrases at stage 212, such as those described above with reference to FIG. 4. The operations can then include sorting the remaining words and/or phrases in the component trace at stage 212. The operations can then include a decision stage 214 to determine whether each of the remaining words and/or phrases has a frequency of appearance greater than a frequency threshold. In response to determining that a remaining word and/or phrase has a frequency of appearance greater than the frequency threshold, the operations can proceed to adding the word and/or phrase to a subset of the remaining words and/or phrases as tokens at stage 216. Otherwise, the word and/or phrase can be eliminated from the subset as a token at stage 218.

Figure 6:
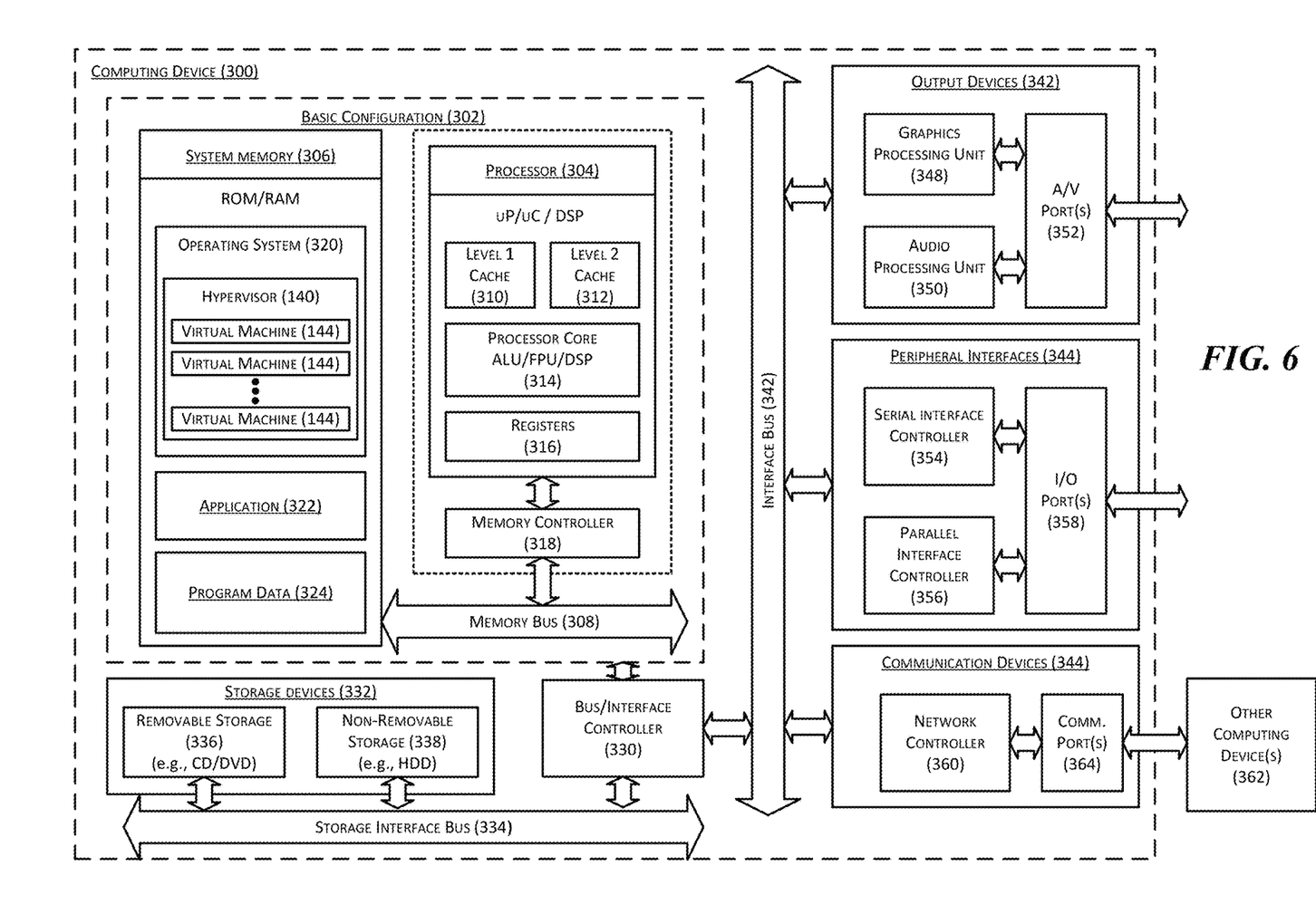
FIG. 6 is a computing device suitable for certain components of the distributed computing system in FIG. 1.

FIG. 6 is a computing device 300 suitable for certain components of the distributed computing system 100 in FIG. 1. For example, the computing device 300 can be suitable for the hosts 106, the client devices 102, or the platform controller 125 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of automated interoperations tracking performed by a server in a distributed computing system having a first software component configured to provide a first computing service and operatively coupled to a second software component configured to provide a second computing service to the first computing service, the method comprising:

receiving, at the server, a first event log from the first software component and a second event log from the second software component, wherein the first computing service having the first software component does not share tracking identifiers with the second computing service having the second software component, and wherein the first event log and the second event log each includes data representing multiple entries each having multiple data fields related to processes executed at the first software component and the second software component;

in response to receiving the first event log and the second event log, calculating a first set of appearance frequencies for a first set of strings in the first event log; and calculating a second set of appearance frequencies for a second set of strings in the second event log;

selecting a first subset of strings from the first set of strings in the first event log based on appearance frequencies of the first subset of strings being below a preset frequency threshold;

selecting a second subset of strings from the second set of strings in the second event log based on appearance frequencies of the second subset of strings being below the preset frequency threshold;

mapping a first string in the first subset of strings and a second string in the second subset of strings to a single token based on correlating the single token within the first string and the second string; and based on mapping the first string and the second string to the single token, generating a new event log that includes a first entry corresponding to the first string in the first subset of strings and a second entry corresponding to the second string in the second subset of strings, wherein the first entry and the second entry are correlated with the single token.

2. The method of claim 1, wherein:

the single token resides in a first data field of the first entry;

the single token resides in a second data field of the second entry; and the first data field of the first entry is different from the second data field of the second entry.

3. The method of claim 1, further comprising:

adding a new data field to the first entry in the new event log indicating the first software component as providing the first entry; and adding the new data field to the second entry in the new event log indicating the second software component as providing the second entry.

4. The method of claim 1 wherein mapping the first string in the first subset of strings and the second string in the second subset of strings to the single token based on correlating the single token within the first string and the second string includes mapping a first token in a first subset of tokens and a second token in a second subset of tokens to the single token based on correlating the single token within the first token and the second token.

5. The method of claim 1, further comprising:

removing one or more words or phrases from entries in the first event log that match a set of grammatical types; and removing a list of pre-defined words or phrases from the entries within the first event log.

6. A method of automated interoperations tracking performed by a server in a distributed computing system having a first software component configured to provide a first computing service and operatively coupled to a second software component configured to provide a second computing service to the first computing service, wherein the first computing service and the second computing service do not share tracking identifiers, the method comprising:

receiving, at the server, a first event log from the first software component and a second event log from the second software component, wherein the first computing service having the first software component does not share tracking identifiers with the second computing service having the second software component, and wherein the first event log and the second event log each includes data representing multiple entries each having multiple data fields related to a task executed at the first software component and the second software component;

in response to receiving the first event log and the second event log, tokenizing the first event log and the second event log by:

calculating a first set of appearance frequencies corresponding to a first set of strings in the first event log;

calculating a second set of appearance frequencies corresponding to a second set of strings in the second event log; and selecting, as tokens, a first subset of strings of the first set of strings in the first event log and a second subset of strings of the second set of strings in the second event log based on strings in the first subset of strings and the second subset of strings each having calculated appearance frequencies below a preset frequency threshold; and based on correlating a first string in the first subset of strings to a second string in the second subset of strings, generating a combined event log for the task executed by both the first software component and the second software component that includes a first entry corresponding to the first string from the first event log and a second entry corresponding to the second string from the second event log within the combined event log.

7. The method of claim 6, further comprising:

calculating an appearance frequency of the first string within the first set of strings as a percentage of total string appearances within the first set of strings in the first event log; and selecting the first string to the first subset of strings in the first event log based on the appearance frequency of the first string being below the preset frequency threshold.

8. The method of claim 7, further comprising:

sorting the first set of strings in the first event log into a first list that is ordered according to appearance percentages; and selecting the first subset of strings in the first event log by selecting a preset number of strings having lowest appearance percentages within the first list.

9. The method of claim 6, wherein the first subset of strings of the first set of strings in the first event log includes a partial universal resource locator.

10. The method of claim 6, wherein:

tokenizing the first event log includes removing one or more words or phrases from the first set of strings that match a set of grammatical types before calculating the first set of appearance frequencies; and the set of grammatical types includes an article, a coordinating conjunction, a subordinating conjunction, a correlative conjunction, a conjunctive adverb, a transition, or a preposition.

11. The method of claim 6, wherein tokenizing the first event log includes removing a list of pre-defined words or phrases from the first set of strings before calculating the first set of appearance frequencies.

12. The method of claim 6, further comprising:

determining that a count of strings in the first subset of strings exceeds a maximum count threshold; and in response to determining that the count of strings in the first subset of strings exceeds the maximum count threshold, decreasing a value of the preset frequency threshold to remove strings from the first subset of strings until the count of strings is below the maximum count threshold.

13. The method of claim 6, wherein:

determining that a count of strings in the first subset of strings is below a minimum count threshold; and in response to determining that the count of strings in the first subset of strings is below the minimum count threshold, increasing a value of the preset frequency threshold to increase strings in the first subset of strings from the first set of strings until the count of strings is above the minimum count threshold.

14. The method of claim 6, wherein generating the combined event log for the task includes:

mapping the first string in the first subset of strings and the second string in the second subset of strings to a single token based on correlating the single token within the first string and the second string; and generating the combined event log to include the first entry corresponding to the first string in the first subset of strings and the second entry corresponding to the second string in the second subset of strings based on mapping the first string and the second string to the single token, wherein the first entry and the second entry are correlated with the single token within the combined event log.

15. A computing device, comprising:
a processor; and
a memory operatively coupled to the processor, the memory having instructions executable by the processor to cause the computing device to:
  receive a first event log from a first software component and a second event log from a second software component, wherein a first computing service having the first software component does not share tracking identifiers with a second computing service having the second software component, and wherein the first event log and the second event log each includes data representing multiple entries each having multiple data fields related to processes executed at the first software component and the second software component;
  calculate a first set of appearance frequencies for a first set of strings in the first event log;
  calculate a second set of appearance frequencies for a second set of strings in the second event log;
  select a first subset of strings from the first set of strings in the first event log based on appearance frequencies from the first set of appearance frequencies of the first subset of strings being below a preset frequency threshold;
  select a second subset of strings from the second set of strings in the second event log based on appearance frequencies from the second set of appearance frequencies of the second subset of strings being below the preset frequency threshold; and
  generate a combined event log for a task executed by both the first software component and the second software components by correlating a single token from a first string in the first subset of strings to the single token in a second string in the second subset of strings.

16. The computing device of claim 15, wherein the first subset of strings of the first subset of strings in the first event log includes a globally unique identifier, a string without spaces, or at least a partial universal resource locator.

17. The computing device of claim 15, wherein the first software component is operatively coupled to the second software component to provide the second computing service to the first computing service.

18. The computing device of claim 15, wherein generating the combined event log includes adding a first entry from the first event log corresponding to the first string in the first subset of strings and a second entry from the second event log corresponding to the second string in the second subset of strings.

19. The computing device of claim 18, wherein the combined event log includes the first entry and the second entry based on mapping the first string and the second string to the single token.

20. The computing device of claim 19, wherein the first entry and the second entry are correlated with the single token within the combined event log.

* * * * *